Figure 1:
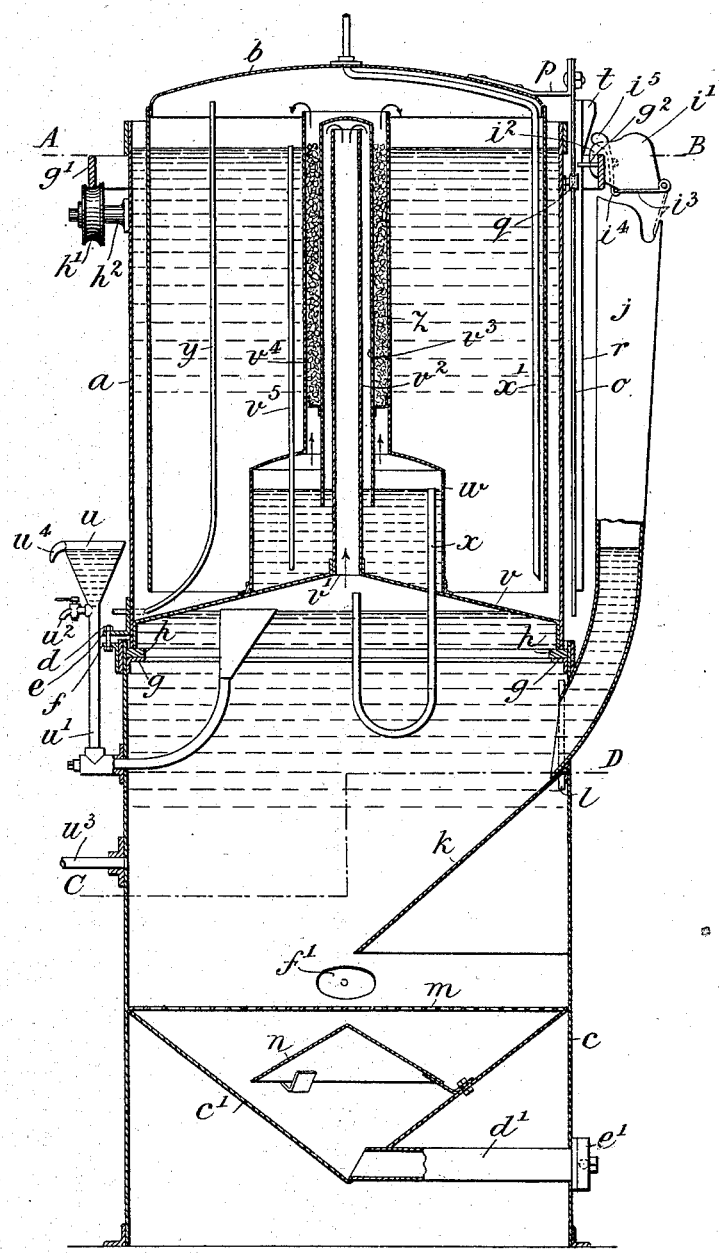

No. 714,490. Patented Nov. 25, 1902.
H. KINSEY, G. CHALLENGER & J. H. NOTT.
ACETYLENE GAS GENERATOR.
(Application filed Dec. 31, 1901.)

(No Model.) 5 Sheets—Sheet 1.

WITNESSES.
Albert Jones
Samuel Percival

INVENTORS.
Henry Kinsey,
George Challenger,
John Henry Nott,
By their Attorneys.
Wheatley & MacKenzie No. 714,490. Patented Nov. 25, 1902.
H. KINSEY, G. CHALLENGER & J. H. NOTT.
ACETYLENE GAS GENERATOR.
(Application filed Dec. 31, 1901.)

(No Model.) 5 Sheets—Sheet 3.

WITNESSES.
Albert Jones
Samuel Percival

INVENTORS.
Henry Kinsey
George Challenger
John Henry Nott
By their Attorneys.
Wheatley & MacKenzie

THE NORRIS PETERS CO., PHOTO-LITHO., WASHINGTON, D. C.

No. 714,490. Patented Nov. 25, 1902.
H. KINSEY, G. CHALLENGER & J. H. NOTT.
ACETYLENE GAS GENERATOR.
(Application filed Dec. 31, 1901.)
(No Model.) 5 Sheets—Sheet 4.
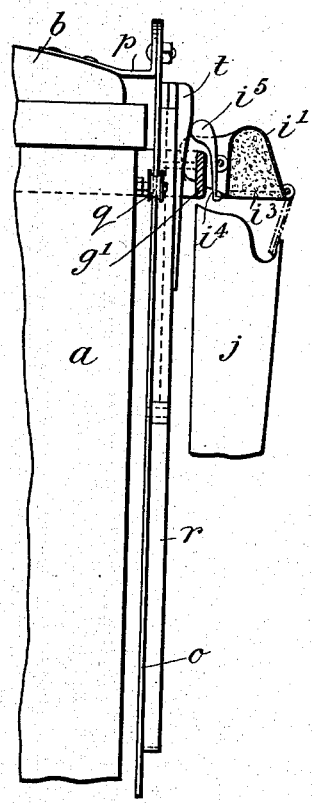
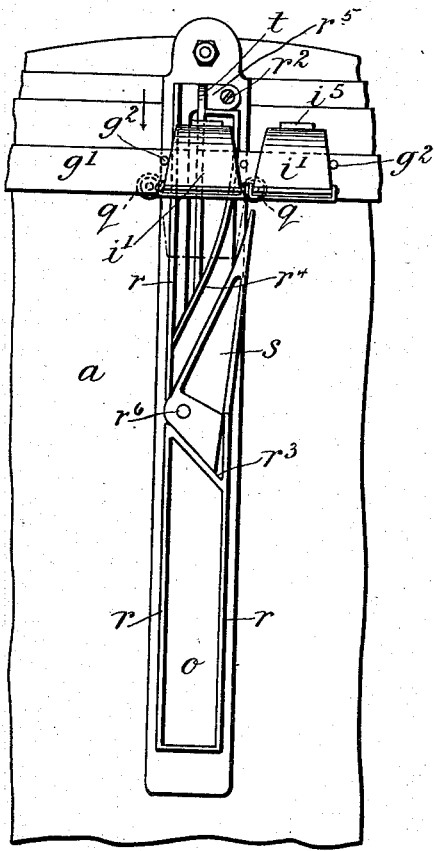

No. 714,490. Patented Nov. 25, 1902.
H. KINSEY, G. CHALLENGER & J. H. NOTT.
ACETYLENE GAS GENERATOR.
(Application filed Dec. 31, 1901.)
(No Model.)  5 Sheets—Sheet 5.
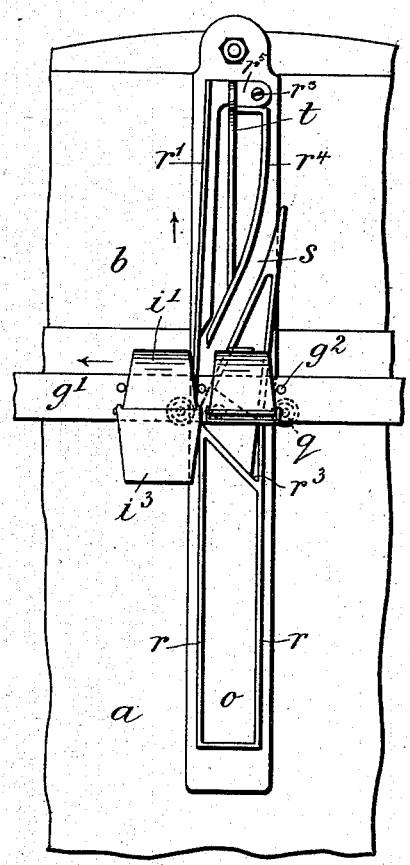
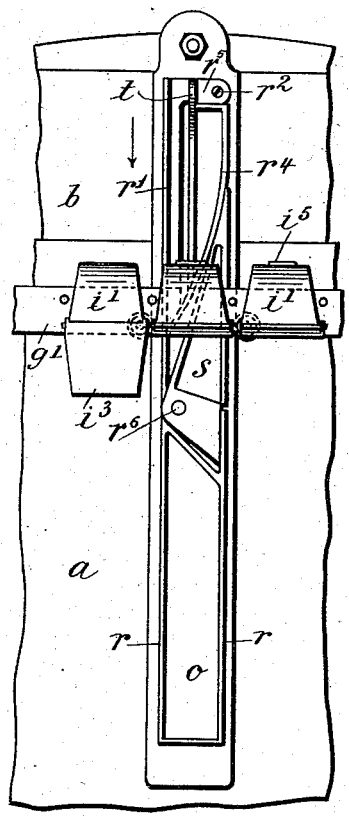

UNITED STATES PATENT OFFICE.

HENRY KINSEY, GEORGE CHALLENGER, AND JOHN HENRY NOTT, OF SWANSEA, ENGLAND.

ACETYLENE-GAS GENERATOR.

SPECIFICATION forming part of Letters Patent No. 714,490, dated November 25, 1902.

Application filed December 31, 1901. Serial No. 87,924. (No model.)

*To all whom it may concern:*

Be it known that we, HENRY KINSEY, residing at 26 Terrace road, GEORGE CHALLENGER, residing at Devonshire Villa, and JOHN HENRY NOTT, residing at 1 Herbert Place, Swansea, county of Glamorgan, England, subjects of the King of Great Britain and Ireland, have invented certain new and useful Improvements in Apparatus for Generating and Storing Acetylene Gas; and we do hereby declare the following to be a full, clear, and exact description of the invention, such as will enable others skilled in the art to which it appertains to make and use the same.

This invention for improvements in apparatus for generating and storing acetylene gas relates to that class of apparatus in which calcium carbid is supplied to an excess of water, and has for its object to provide a simple and thoroughly reliable feed mechanism which shall regulate the supply of carbid to the generator according to the consumption of the gas, preventing overproduction; also, to provide means for drawing off the thicker sludge, thus rendering the operation easy, cleanly, and safe.

According to this invention the apparatus comprises a gasometer-tank and a bell adapted to rise and fall in the tank, a generator-tank, preferably arranged underneath the gasometer-tank, a carbid-receptacle carrier or ring mounted to rotate around the upper part of the gasometer-tank, a number of carbid-receptacles arranged on the carrier and provided with hinged bottoms, and a sliding bar, hereinafter called the "feed-bar," adapted to rise and fall with the gasometer-bell and to successively release the flaps or bottoms of the carbid-receptacles, allowing the carbid to fall therefrom into the mouth of a funnel or chute which conducts it into the generator. The bottom of the receptacle is released on the downward stroke of the feed-bar, and as the feed-bar rises the receptacle-carrier is partly rotated thereby to move away the empty receptacle and bring a full receptacle into position over the feed-chute. The carbid holders or receptacles vary in number according to the circumference of the carrying-ring, the capacity of each holder being such that the quantity of gas generated from the carbid contained in each holder will not quite fill the gas-holder.

Figure 2:
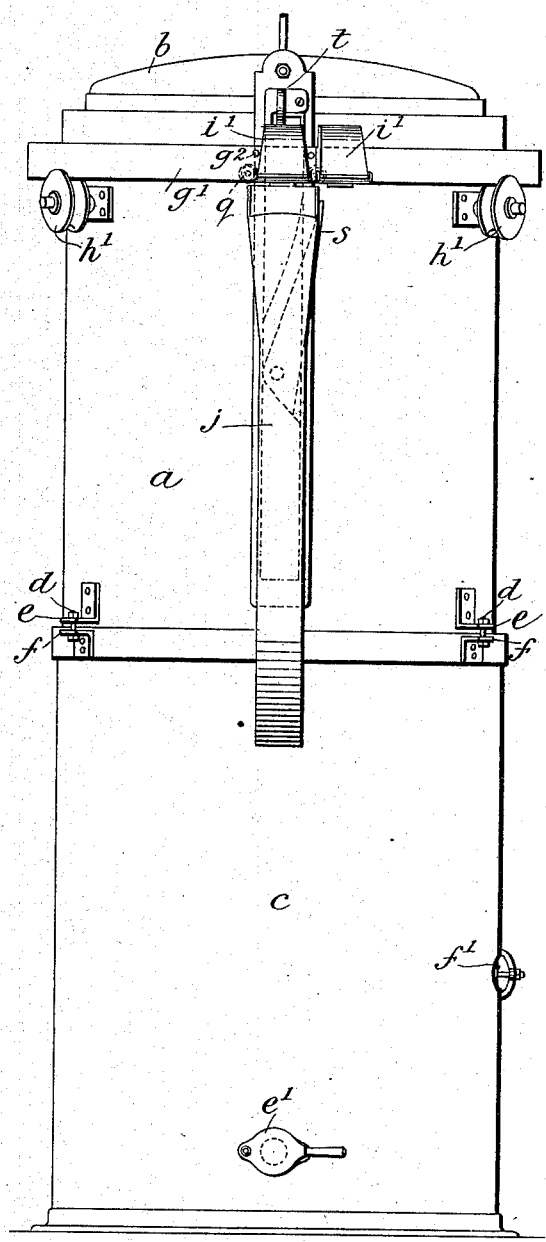
Figure 3:
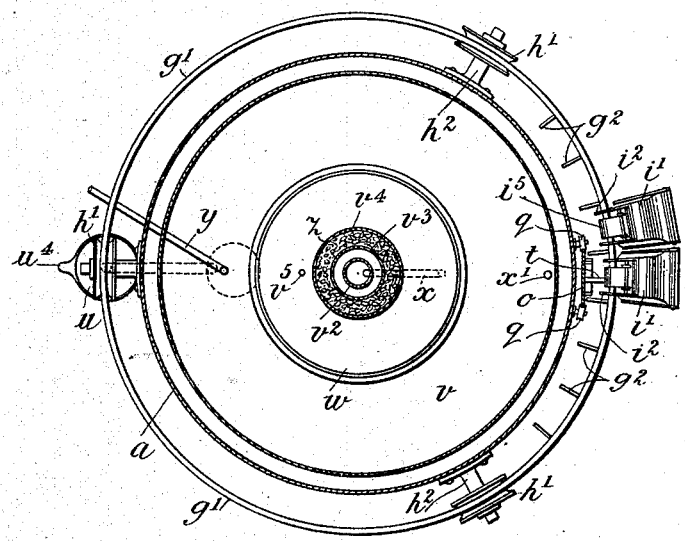
Figure 4:
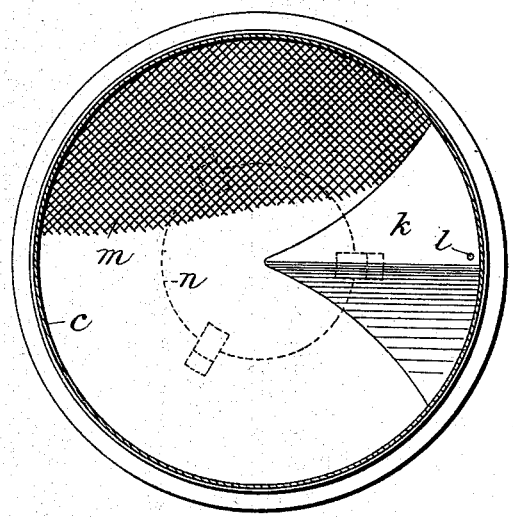

In the accompanying drawings, Figure 1 is a sectional elevation of acetylene-gas apparatus constructed according to this invention. Fig. 2 is an elevation at right angles to Fig. 1. Fig. 3 is a section taken on the line A B, Fig. 1. Fig. 4 is a section on the line C D, Fig. 1. Fig. 5 is a vertical section on a slightly-larger scale of the carbid-feed devices. Figs. 6, 7, and 8 are front elevations of the same and showing the feed-bar in different positions.

The gasometer-tank $a$ and bell $b$ are mounted on the generator-tank $c$ and are fixed in position by bolts $d$, which pass through lugs $e\ f$ on the two tanks, the generator-tank $c$ being also provided with an annular bracket or flange of angle-iron $g$, carrying an india-rubber packing-ring $h$, on which the lower edge of the gasometer-tank is pressed tightly by the bolts $d$ to form a gas and water tight joint.

In some cases, especially where the height of the apparatus is an object, instead of placing the generator underneath the water-tank the generator is constructed as a separate vessel, which may be placed alongside of the water-tank and gas-holder.

A carbid-receptacle carrier-ring $g'$, provided with a number of radially-mounted pins $g^2$, is mounted to rotate around the upper part of the gasometer-tank $a$ on the rollers $h'$, which are loosely mounted on brackets $h^2$, fixed on the tank $a$. A number of carbid-receptacles $i'$ are carried on the ring, each receptacle having a pair of hook-shaped side extensions $i^2$, by means of which they are held in position. The receptacles $i'$ are closed by hinged flaps $i^3$, which are kept in the closed position by lever-catches $i^4$, pivoted between the side extensions $i^2$ and weighted at their upper ends by cam-like projections $i^5$, adapted to be operated to open the receptacles by a sliding feed-bar, as hereinafter described.

The feed-bar $o$, which not only effects the traverse of the ring $g'$ for the purpose of removing the empty carbid-receptacles and bringing the full receptacles successively over the feed-chute, hereinafter described, but also the opening of the receptacle to allow it to empty automatically, is suspended vertically from a bracket $p$, fixed to the top of the gasometer-bell $b$, and moves up and down with the bell guided by rollers $q$ between the ring $g'$ and the tank $a$. The feed-bar $o$ is provided with guide-ribs $r\ r'\ r^4$ integral with it and which project between two of the pins $g^2$ on the inside of the ring $g'$, thus locking the ring $g'$ and the carbid-receptacles in their proper positions and preventing their being moved except by the action of the gas-holder. The rib $r'$ is formed with a lateral extension or arm $r^5$ at its upper end, whereby it is pivoted to the bar $o$ at $r^2$, and is thus capable of being pushed outward at its lower end by the pins $g^2$ on the ring $g'$ to allow them to pass in front of the feed-bar under the action of a cam $s$, as hereinafter described, the said rib $r'$ falling automatically into its normal position under the action of gravity, so as to close the lower end of the gap between the rib $r'$ and cam $s$. The rib $r^4$ is curved across the face of the feed-bar, as shown. The tapered tongue-like cam $s$ is pivoted on the feed-bar $o$ at $r^6$ about midway of its length, the said pivot being located near one side of the cam, as shown, so that the cam tends to fall into the inclined position shown in Fig. 6, in which it rests on the stop-rib $r^3$. In this position of the cam $s$ a gap is formed across the feed-bar between the curved rib $r^4$ and the upper face of the cam $s$, through which gap one of the pins $g^2$ is passed each time the feed-bar rises, the pin being gathered in by the projecting point of the cam and forced through the gap by the upper or working face thereof. A small inclined cam projection $t$ is fixed to the feed-bar $o$ at its upper end and adapted to engage the projection $i^5$ on the lever-catch $i^4$ to force back the lever and release the hinged flaps of the receptacles $i'$ when the bell $b$ is lowered.

The generator-tank $c$ is provided with a feed-chute $j$ for the carbid, and fixed inside the generator, below the delivery end of the chute, is a triangular distributing-plate $k$, arranged with its apex directed downwardly toward the center of the generator and bent along a bisecting line to form opposite inclines down which the carbid rolls. A small open-ended tube $l$ is passed through the plate $k$ to convey away any gas which might collect thereunder. Below the triangular plate $k$ a grid $m$ is fixed, upon which the carbid rests during hydration, a conical plate $n$ being mounted underneath the grid to facilitate the drawing off of sludge from the generator.

The tank $c$ has a conical bottom $c'$ communicating with a draw-off pipe $d'$, normally closed by a valve $e'$. It is also provided with a mud-door $f'$ above the grid $m$.

The generator-tank $c$ is filled with water through a pipe $u^3$ from a tank or cistern provided with a ball-cock, or it may be filled through a funnel $u$ and tube $u'$, the said funnel being provided with an overflow-spout $u^4$ to allow of the escape of any water which may be forced out by the pressure of gas in the generator. The bottom $v$ of the gasometer-tank $a$, forming the top of the generator-tank, is slightly conical and is provided with a central opening $v'$, in which a vertical open-ended tube $v^2$ is fixed. This tube is partly inclosed in a second tube or sleeve $v^3$, closed at its upper end and depending with its lower open end into a chamber $w$, containing water and forming a water seal to prevent gas escaping from the gasometer when the generator is emptied for the purpose of drawing off sludge or residue from the spent carbid. The chamber $w$ is supplied with water from the tank $a$ by an overflow-pipe $v^5$. An overflow-pipe $x$, communicating with the interior of the chamber $w$ and generator-tank, prevents the chamber $w$ from being overfilled, and is U-shaped, as shown, to prevent gas escaping therethrough when the generator is being cleaned out. A third tube $v^4$, open at both ends, surrounds the tubes $v^2$ and $v^3$, its lower end being in communication with the upper part of chamber $w$ and its upper end opening into the upper part of the gasometer-bell. The annular space between the tubes $v^3$ and $v^4$ is partially filled with a suitable gas-purifying material $z$.

A safety-pipe $x'$, terminating near the bottom of the bell, is arranged to carry off excess of gas should the bell rise too high.

The gas is led away for consumption by a pipe $y$.

The starting and working of the apparatus is as follows: The filled carbid-receptacles $i'$ are suspended on the carrying-rings, their flaps all being closed. The gasometer-tank $a$ is nearly filled with water and a small vent-cock (not shown) opened to let out the air from within the bell $b$. The generator-tank $c$ is also filled to the level of the trial-cock $u^2$. The chamber $w$ is filled from the tank $a$ through the overflow-pipe $v^5$ to the level of the top of the pipe $x$, and the feed-bar $o$ is in the position shown in Fig. 6. The carbid-receptacle $i'$, which is over the chute, is now discharged by hand into the chute. The gas generated from the carbid rises through the water to the upper end of the generator and passes from thence upward through tube $v^2$, then downward through the annular space between tubes $v^2$ and $v^3$, then up through the purifying material $z$ into the gasometer-bell $b$. The bell $b$ then rises, carrying with it the suspended feed-bar $o$, the point of the tapered cam $s$ passing behind one of the pins $g^2$, the cam as the bell is further raised pressing on the pin with its upper inclined face and traversing the ring $g'$ forward sufficiently to carry the empty receptacle $i'$ from over the chute and to bring another full one into position, the said traverse corresponding to the distance between the outer surfaces of the guide-ribs $r$, the pins $g^2$ being forced across the front of the feed-bar $o$, pushing aside the pivoted rib $r'$ and taking up a position on the opposite side of the feed-bar. When the feed-bar descends, owing to the emptying of the gasometer-bell, the cam $s$ comes against the next advancing pin $g^2$ and is pushed inward until its outer edge is in line with the guide-ribs $r\ r^4$, Fig. 8, so that the descent of the feed-bar is not impeded; but immediately the point of the cam $s$ has descended below the pin $g^2$ the cam again resumes the position shown in Fig. 6, ready to engage another pin $g^2$ and advance the carrying-ring $g^8$ at the next ascent of the bell. When the bell $b$ has nearly reached its lowest position, the inclined projection $t$ on the feed-bar comes against the projection $i^5$ on the lever-catch $i^4$, tilting the said lever and releasing the hinged flap $i^3$ of the receptacle $i'$, which falls and empties the receptacle into the chute $j$.

What we claim, and desire to secure by Letters Patent, is—

1. In apparatus for generating acetylene gas, the combination with the gasometer-tank, bell and generator of a carbid-receptacle carrier-ring mounted to rotate around the tank, radial pins mounted on the ring at equal distances apart, carbid-receptacles mounted on the rings, hinged flaps or bottoms on the receptacles opening downward, catches or holding devices pivoted to the receptacles and adapted to secure the hinged flaps in the closed position, a vertical feed-bar suspended from the gasometer-bell and working between the pins on the carrier-ring, a tapered tongue-like cam pivoted on the outer face of the feed-bar in such a manner that normally its upper end projects slightly past the side of the bar, but is capable of being pushed in flush therewith, and an inclined projection on the upper end of the feed-bar arranged to come against the catches or holding devices on the receptacles to release the flaps of the receptacles, substantially as described.

2. Apparatus for generating and storing acetylene gas consisting of a generator-tank, a gasometer-tank mounted on the generator, a bell or gas-holder adapted to rise and fall in the tank, a gas-uptake fixed centrally in the tank and communicating with the generator, a pair of concentric tubes surrounding the uptake, a means for purifying the gas as it passes through the tubes, a water-chamber surrounding the lower end of the uptake and forming a water seal with one of the concentric tubes, a means for feeding and determining the level of the water in the chamber, a carbid-feed chute opening into the generator-tank below the water-level, a carbid-carrier ring mounted to rotate on the gasometer-tank above the feed-chute, carbid-receptacles supported on the ring, and a vertical feed-bar suspended from the gasometer-bell and adapted to rotate the receptacle carrier-ring each time the bell rises to bring a filled receptacle over the feed-chute, and to open the receptacle when the bell is lowered to feed the carbid to the generator, substantially as described.

3. In apparatus generating acetylene gas a generator-tank having an inverted cone or funnel-shaped bottom, a conical plate mounted in the funnel-shaped bottom, a grid mounted above the conical plate, and a distributing-plate mounted above the grid, the whole substantially as described and for the purpose specified.

4. In apparatus for generating acetylene gas, a gasometer, a carbid-receptacle, carrier-ring mounted to rotate around the gasometer-tank, radial pins mounted on the ring at equal distances apart, and carbid-receptacles mounted on the ring and having hinged flaps or bottoms on the receptacles opening downward, in combination with a vertical feed-bar suspended from the gasometer-bell and working between the pins on the carrier-ring, a tapering tongue-like cam pivoted on the outer face of the feed-bar, and an inclined projection adapted to release the hinged flaps of the receptacles, substantially as described.

In testimony whereof we have affixed our signatures in presence of two witnesses.

HENRY KINSEY.
GEORGE CHALLENGER.
JOHN HENRY NOTT.

Witnesses:
HUGH WILSON PATON,
STEPHEN WALTER THOMAS.